United States Patent
Preston

(10) Patent No.: US 7,131,233 B1
(45) Date of Patent: Nov. 7, 2006

(54) SCENTED FISHING LURE

(76) Inventor: Brian P. Preston, 1732 Lucky St., Las Vegas, NV (US) 89104

( * ) Notice: Subject to any disclaimer, the term of this patent is extended or adjusted under 35 U.S.C. 154(b) by 0 days.

(21) Appl. No.: 11/174,113

(22) Filed: Jul. 5, 2005

(51) Int. Cl.
*A01K 85/01* (2006.01)

(52) U.S. Cl. .................................... 43/42.06

(58) Field of Classification Search .............. 43/42.06, 43/44.99
See application file for complete search history.

(56) References Cited

U.S. PATENT DOCUMENTS

| | | | | |
|---|---|---|---|---|
| 1,993,990 A | * | 3/1935 | Catarau | 43/42.06 |
| 2,028,050 A | * | 1/1936 | De Witt | 43/42.06 |
| 2,256,813 A | * | 9/1941 | Mikina | 43/42.06 |
| 2,465,127 A | * | 3/1949 | Stark | 43/44.99 |
| 2,532,879 A | * | 12/1950 | Baker | 43/42.06 |
| 2,546,516 A | * | 3/1951 | Nardi | 43/42.06 |
| 2,549,077 A | * | 4/1951 | Garth | 43/42.06 |
| 2,674,058 A | * | 4/1954 | Lindenberg | 43/42.06 |
| 2,749,647 A | * | 6/1956 | Beloff | 43/42.06 |
| 2,922,246 A | * | 1/1960 | Mileschuk | 43/42.06 |
| 2,983,065 A | * | 5/1961 | Ferguson et al. | 43/42.06 |
| 3,105,317 A | * | 10/1963 | Fox | 43/42.06 |
| 3,108,389 A | * | 10/1963 | McGuire | 43/42.06 |
| 3,434,230 A | * | 3/1969 | Littlefield | 43/42.06 |
| 3,449,852 A | * | 6/1969 | Mitchell | 43/42.06 |
| 3,546,806 A | * | 12/1970 | Hatta | 43/44.99 |
| 3,585,749 A | * | 6/1971 | Dieckmann | 43/42.06 |
| 3,626,628 A | * | 12/1971 | Weimer | 43/42.06 |
| 3,654,724 A | * | 4/1972 | Charron | 43/42.06 |
| 3,835,572 A | * | 9/1974 | Mounsey | 43/42.06 |
| 3,987,575 A | * | 10/1976 | Morita | 43/42.06 |
| 3,991,504 A | * | 11/1976 | Pieper | 43/42.06 |
| 4,044,490 A | * | 8/1977 | Young et al. | 43/42.06 |
| 4,047,317 A | * | 9/1977 | Pfister | 43/42.06 |
| 4,197,667 A | * | 4/1980 | Helfenstine et al. | 43/42.06 |
| 4,205,476 A | * | 6/1980 | Hsu | 43/42.06 |
| 4,257,182 A | * | 3/1981 | Thom | 43/42.06 |
| 4,267,658 A | * | 5/1981 | Brown et al. | 43/42.06 |
| 4,553,348 A | * | 11/1985 | Cooper | 43/42.06 |
| 4,610,103 A | * | 9/1986 | Steinman | 43/42.06 |
| 4,742,638 A | * | 5/1988 | Vobejda | 43/42.06 |
| 4,823,497 A | * | 4/1989 | Pierce | 43/42.06 |
| 4,881,340 A | * | 11/1989 | Davis | 43/42.06 |
| 4,888,907 A | * | 12/1989 | Gibbs | 43/42.06 |
| 4,962,609 A | * | 10/1990 | Walker | 43/42.06 |
| 4,964,235 A | * | 10/1990 | Gruelle | 43/42.06 |
| 5,113,606 A | | 5/1992 | Rinker | |
| 5,155,947 A | * | 10/1992 | Rivard | 43/42.06 |

(Continued)

FOREIGN PATENT DOCUMENTS

AU    9918366 A  *  3/2000

(Continued)

*Primary Examiner*—Darren W. Ark

(57) ABSTRACT

A fishing lure includes a body provided with head and tail portions, apertures spaced along a longitudinal axis thereof, and an opening formed in a top surface thereof that is in fluid communication with the apertures. The opening houses scented agents therein so that same can be discharged when the lure travels through water. The opening has vertical and horizontal regions for maintaining the scented agents and further has a closed distal end restricting the agents from prematurely exiting the body. Eyelets are conjoined to the body and extend outwardly therefrom. One eyelet is disposed subjacent to the head and another eyelet is disposed subjacent to the tail. A third eyelet is disposed adjacent to the head and extends orthogonally therefrom. One treble hook is conjoined to the first eyelet and another treble hook is conjoined to the second eyelet. The treble hooks pivot about the eyelets respectively.

9 Claims, 3 Drawing Sheets

U.S. PATENT DOCUMENTS

| | | | |
|---|---|---|---|
| 5,170,579 A | 12/1992 | Hollinger | |
| D346,848 S | 5/1994 | Wenger et al. | |
| 5,471,780 A * | 12/1995 | Hopson | 43/42.06 |
| 5,517,781 A * | 5/1996 | Paoletta, Jr. | 43/42.06 |
| 5,603,182 A * | 2/1997 | Wilson | 43/44.99 |
| 5,617,669 A * | 4/1997 | Levey | 43/44.99 |
| 5,638,630 A * | 6/1997 | Volaski | 43/44.99 |
| 6,079,145 A * | 6/2000 | Barringer | 43/42.06 |
| 6,079,146 A | 6/2000 | Larsen | |
| 6,354,037 B1 * | 3/2002 | Coppola, Jr. | 43/42.06 |
| 6,393,756 B1 * | 5/2002 | Forney et al. | 43/42.06 |
| 6,412,214 B1 * | 7/2002 | Sebastiani | 43/42.06 |
| 6,668,482 B1 * | 12/2003 | Ruffin et al. | 43/42.06 |
| 6,779,293 B1 * | 8/2004 | Rice | 43/42.06 |
| 6,922,937 B1 * | 8/2005 | Gilbert | 43/42.06 |
| 2005/0028424 A1 * | 2/2005 | Poinski | 43/42.06 |

FOREIGN PATENT DOCUMENTS

| | | | | |
|---|---|---|---|---|
| FR | 2782895 A1 * | 3/2000 | | |
| GB | 2055531 A * | 3/1981 | | |
| GB | 2402033 A * | 12/2004 | | |
| GB | 2407954 A * | 5/2005 | | |
| JP | 2002-272337 A * | 9/2002 | | |
| JP | 2003-61518 A * | 3/2003 | | |
| JP | 2003-144013 A * | 5/2003 | | |
| JP | 2004-166672 A * | 6/2004 | | |
| JP | 2005-224229 A * | 8/2005 | | |
| WO | WO-86/00499 A1 * | 1/1986 | | 43/42.06 |
| WO | WO-89/07393 A1 * | 8/1989 | | |
| WO | WO-90/01264 A1 * | 2/1990 | | |
| WO | WO-98/52408 A1 * | 11/1998 | | |
| WO | WO-01/95712 A1 * | 12/2001 | | |
| WO | WO-2005/077163 A1 * | 8/2005 | | |
| WO | WO-2005/084432 A1 * | 9/2005 | | |

* cited by examiner

SCENTED FISHING LURE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to fishing lures and, more particularly, to a scented fishing lure for attracting and catching fish.

2. Prior Art

Various types of fishing lures are known in the prior art, and most will catch fish. However, fisherman have found that they can improve the performance of a lure by applying a liquid, oil or gel to the lure that makes it smell more appealing to the predatory fish. Unfortunately, applying scent to a solid fishing lure, such as crank baits, has proven to be troublesome for a number of reasons.

One problem that arises immediately is the mess created by manually applying the scented oils, liquids or gels to an exterior surface of the lure. This causes the scent to impregnate the fisherman's skin, which is not desirable. A further disadvantage is the fact that scents, especially in the form of oils and gels, have a tendency to distort the appearance of the fishing lure exterior surface once it is placed in the water. Another drawback of applying scents to a fishing lure is the fact that such scents have a tendency to quickly dissolve into the water, and thus require frequent reapplication.

In response to these drawbacks, scented fishing lures were introduced to the prior art. One such example generally discloses a fishing lure formed from fibrous material which is impregnated with a fish attracting substance. However, the principal difficulty with devices of this type is impregnating the fibrous fishing lure body with the fish attractant substance. Furthermore, the fibrous material still has a tendency to release the scent too rapidly, thus requiring frequent rescenting thereof.

Other disclosed examples include lures formed from fish food which provides a scent to attract fish, lures formed of materials that have been intermixed with scents such as a lure with a fish oil intermixed with the plastic formulation from which the lure is made, and a slowly dissolving lure made of a polymer with an fish scent attractant impregnated therein. Further examples include lures having inner receptacles containing scented substances or fluids such as a lure comprising a pouch for receiving bait or scented substances and a fishing scent delivery system comprising a bladder which releases a fishing scent material in the vicinity of a fishing lure. Other types of scent bearing lures include those in which scent impregnated materials not integral to the lure structure are included. Unfortunately, lures made of materials with scents impregnated therein have limited lifetimes and over time, the intensity of the scent diminishes, thus rendering the lure less appealing to fish.

Accordingly, a need remains for a scented fishing lure in order to overcome the above-noted shortcomings. The present invention satisfies such a need by providing a scented fishing lure that is easy to use, increases the chances of attracting a fish, and is adaptable in design to various fishing applications. Such a scented fishing lure provides a convenient way to use a scent for attracting more fish and drawing more strikes. The scent trail left by the lure convinces predatory fish that the lure is alive and represents an easy meal. Such a scent trail also draws fish to the lure in dark, cloudy water, and thus helps the fish to find the lure and strike at it more accurately. The liquid, gel, or oils used for scent also have an attractive taste to the predatory fish, which encourages them to hold onto the bait for longer periods of time. This advantageously gives the fisherman an increased amount of time to respond to an initial strike, and to set the hook more securely. The scented fishing lure is more appealing than conventional fishing lures because it requires fewer reapplications of the scent, and eliminates the need for the fisherman to directly contact the scented materials.

BRIEF SUMMARY OF THE INVENTION

In view of the foregoing background, it is therefore an object of the present invention to provide a scented fishing lure. These and other objects, features, and advantages of the invention are provided by a scented fishing lure for attracting and catching fish.

The fishing lure includes a body that has a substantially bait fish shape provided with head and tail portions. Such a body further includes a plurality of apertures medially and equidistantly spaced along a longitudinal axis of the body. The body may include a dorsal fin medially disposed along a top surface of the body. Such a body also has an opening medially formed in a top surface of the head portion wherein the opening is in fluid communication with the apertures. The apertures are equidistantly spaced along the horizontal region of the opening.

The opening is suitably sized and shaped for conveniently housing a predetermined quantity of scented agents so that the scented agents can effectively be contained within the opening and selectively discharged when the fishing lure travels through the water. Such an opening has monolithically formed vertical and horizontal regions for effectively maintaining the scented agents at a compacted position. The opening further has a closed distal end portion for advantageously restricting the scented agents from prematurely exiting the body. The opening preferably defines a channel extending along a partial length of the longitudinal axis for conveniently and effectively receiving a scented agent therein such that when the fishing lure is transported through an aqueous environment, the scented agent is dispersed via the apertures for advantageously attracting fish.

A plurality of eyelets are directly conjoined to the body and extend outwardly therefrom. A first one of such eyelets is disposed subjacent to the head portion and extends orthogonally and downwardly therefrom. A second one of the eyelets is disposed subjacent to the tail portion and extends obliquely and downwardly therefrom. A third one of the eyelets is disposed adjacent to the head portion and extends orthogonally therefrom and parallel to the axis. Such a third eyelet has a diameter greater than the first and the second eyelets respectively so that a user can conveniently and readily tether a fishing line thereto.

A plurality of coextensive treble hooks are directly and pivotally conjoined to the eyelets respectively. One treble hook is conjoined to the first eyelet and another treble hook is conjoined to the second eyelet. Such treble hooks extend downwardly from the first and the second eyelets and are effectively caused to pivot about the first and the second eyelets during operating conditions. One treble hook terminates at a predetermined point lower than another treble hook.

The treble hooks preferably further include a shank portion and a plurality of barbs monolithically formed therewith. The barbs have an arcuate shape and are equidistantly spaced from the shank portion. Such barbs have tapered end portions extending upwardly towards the body and parallel to the shank portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
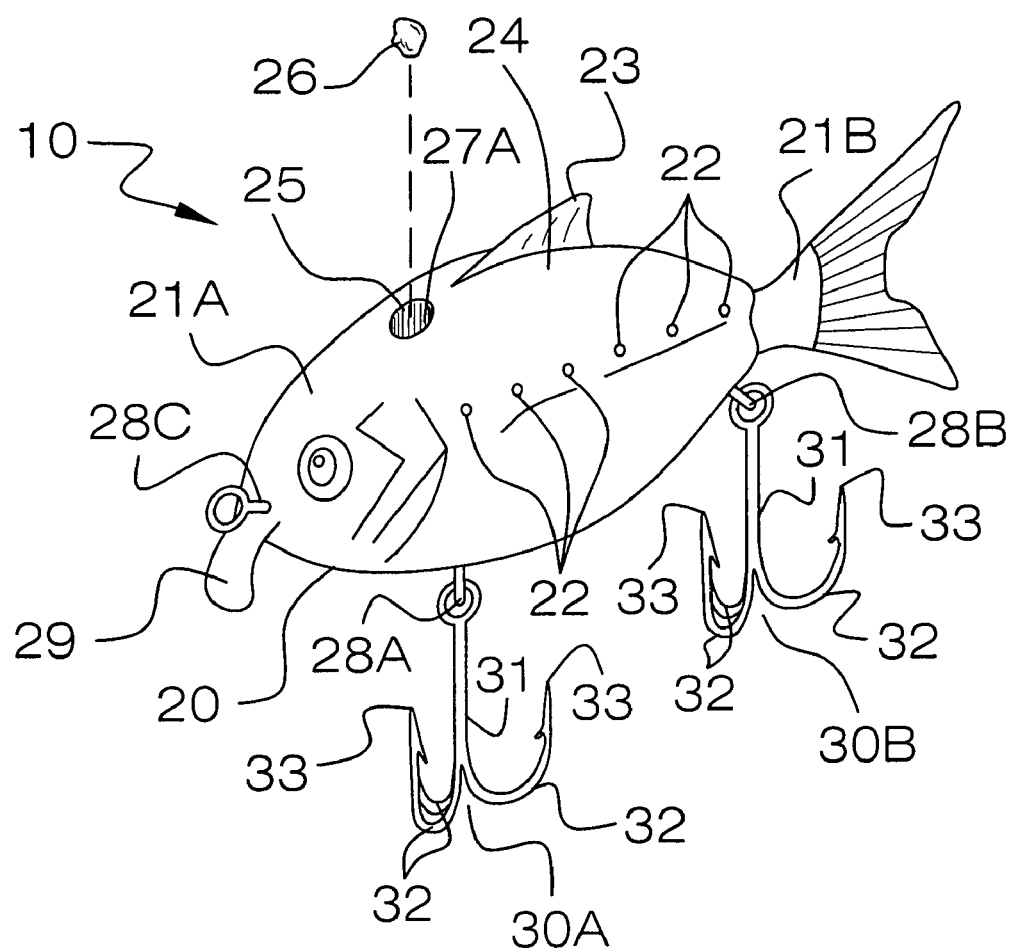
FIG. 1 is a perspective view showing a scented fishing lure, in accordance with the present invention.
Figure 2:
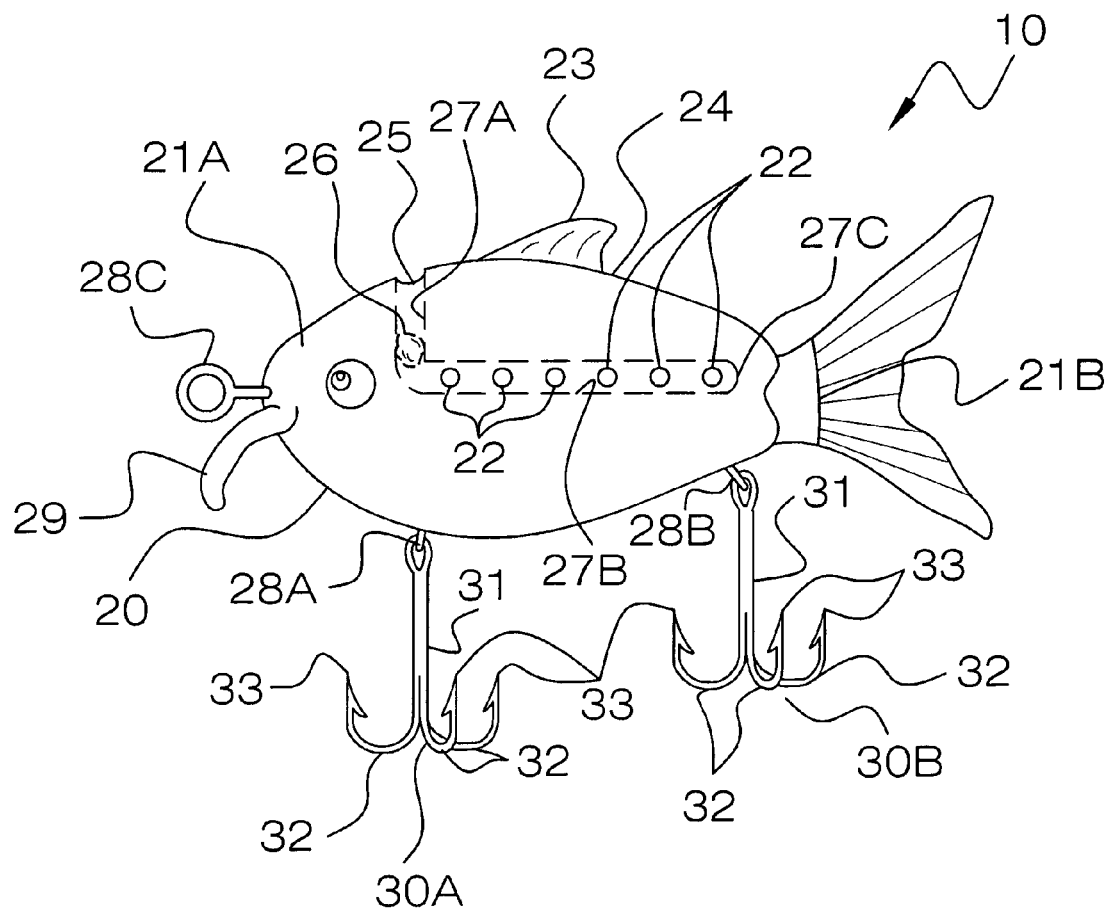
FIG. 2 is a side-elevational view of the apparatus shown in FIG. 1.
Figure 3:
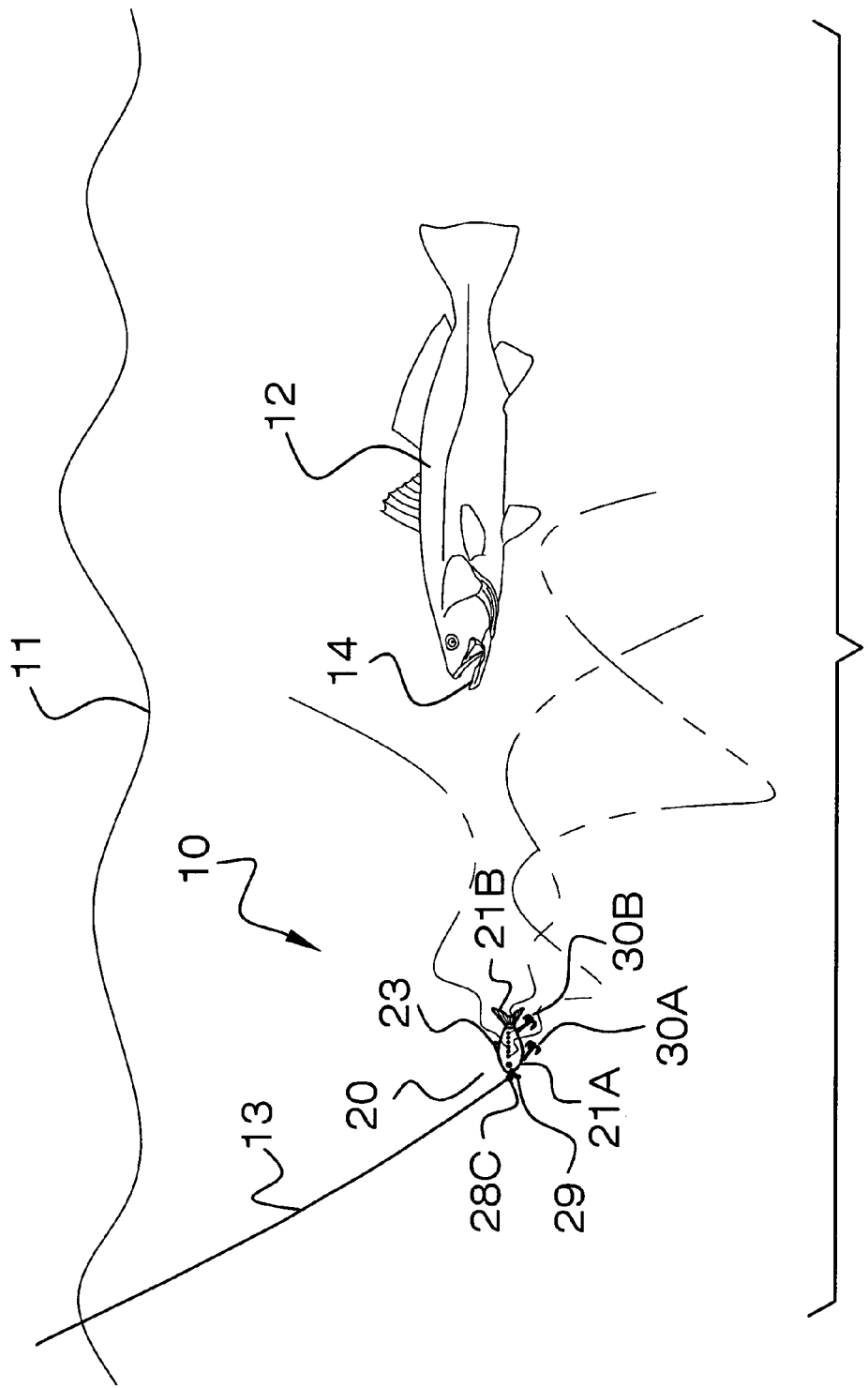
FIG. 3 is a side elevational view of the apparatus shown in FIG. 1, showing the fishing lure during operating conditions in a preferred environment.

The apparatus of this invention is referred to generally in FIGS. 1–3 by the reference numeral 10 and is intended to provide a scented fishing lure. It should be understood that the apparatus 10 may be used to lure and attract many different types of fish in many different aqueous environments and should not be limited in use to only fresh or salt water use.

Referring initially to FIG. 1, the apparatus 10 includes a body 20 that has a substantially bait fish shape provided with head 21A and tail 21B portions. Of course, the apparatus 10 may be sized and shaped to represent any number of various bait species, such as crawfish, minnows, and worms, for example, as is obvious to a person of ordinary skill in the art. Such a body 20 further includes a plurality of apertures 22 medially and equidistantly spaced along a longitudinal axis of the body 20. The apertures 22 are equidistantly spaced along the horizontal region 27B (described herein below) of the opening 25 (described herein below). The apertures 22 are aligned along a rectilinear path that is parallel with a longitudinal axis of the body 20 and extend through a side of the body 20 in a direction which is perpendicular to the longitudinal axis of the body 20. However, such apertures 22 may, of course, be alternately spaced along the body 20 depending on the type of bait species represented, as is obvious to a person of ordinary skill in the art.

The body 20 includes a dorsal fin 23 medially disposed along a top surface 24 thereof. Of course, other fins 23 may be included to further increase the realistic appearance of the apparatus 10, and to reduce the drag coefficient thereof, as is obvious to a person of ordinary skill in the art. Such a body 20 also has an opening 25 medially formed in a top surface 24 of the head portion 21A wherein the opening 25 is in fluid communication with the apertures 22.

Referring to FIGS. 1, 2 and 3, the opening 25 is suitably sized and shaped for conveniently housing a predetermined quantity of scented agents 26, as well known in the industry, and which is essential so that the scented agents 26 can effectively be contained within the opening 25 and selectively discharged when the fishing lure 10 travels through the water 11, as is best shown in FIG. 3. Of course, the scented agents 26 may be produced in a variety of forms including, but not limited to, liquids, gels and oils, as is obvious to a person of ordinary skill in the art. This feature advantageously allows a nearby predatory fish 12 to become aware of and more easily locate the apparatus 10.

Furthermore, with repeated casts in the same general location, that region of the water will become impregnated with the scented agent 26, and thus attract multiple fish 12 to that location, advantageously further increasing the chances of landing a fish 12. Such an opening 25 has monolithically formed vertical 27A and horizontal 27B regions for effectively maintaining the scented agents 26 at a compacted position. The vertical 27A and horizontal 27B regions being generally perpendicular to each other. The opening 25 further has a closed distal end portion 27C that is vital and advantageous for restricting the scented agents 26 from prematurely exiting the body 20. This feature advantageously increases the effective life of the scented agents 26 within the body 20, thus advantageously reducing the need for replacement thereof.

The opening 25 defines a channel extending along a partial length of the longitudinal axis for conveniently and effectively receiving a scented agent 25 therein such that when the fishing lure 10 is transported through an aqueous environment 11 the scented agent 26 is dispersed via the apertures 22, which is critical and advantageous for attracting fish 12, as is best shown in FIG. 3.

Referring to FIGS. 1 and 2, a plurality of eyelets 28 are directly conjoined, with no intervening elements, to the body 20 and extend outwardly therefrom. A first one 28A of such eyelets 28 is disposed subjacent to the head portion 21A and extends orthogonally and downwardly therefrom. A second one 28B of the eyelets 28 is disposed subjacent to the tail portion 21B and extends obliquely and downwardly therefrom. A third one 28C of the eyelets 28 is disposed adjacent to the head portion 21A and extends orthogonally therefrom and parallel to the axis. Such a third eyelet 28C has a diameter greater than the first 28A and the second 28B eyelets respectively, which is crucial so that a user can conveniently and readily tether a fishing line 13 thereto.

Referring to FIGS. 1 through 3, a plurality of coextensive treble hooks 30 are directly and pivotally conjoined, with no intervening elements, to the eyelets 28A, 28B respectively. One treble hook 30A is conjoined to the first eyelet 28A and another treble hook 30B is conjoined to the second eyelet 28B. Such treble hooks 30 extend downwardly from the first 28A and the second 28B eyelets and are effectively caused to pivot about the first 28A and the second 28B eyelets during operating conditions.

This pivoting action is critical for aligning the treble hooks 30 at a more favorable angle for penetrating a fish's mouth 14 during a strike at the apparatus 10, thus advantageously increasing the chances of catching and landing a fish 12, as is best shown in FIG. 3. One treble hook 30A terminates at a predetermined point lower than another treble hook 30B. Of course, further eyelets 28 and treble hooks 30 may be added to the apparatus 10 depending on the size and application thereof, as is obvious to a person of ordinary skill in the art, and as well known in the industry.

Referring to FIGS. 1 and 2, the treble hooks 30 further include a shank portion 31 and a plurality of barbs 32 monolithically formed therewith. The barbs 32 have an arcuate shape and are equidistantly spaced from the shank portion 31. Such barbs 32 have tapered end portions 33 extending upwardly towards the body 20 and parallel to the shank portion 31. The barbs 32 and tapered end portions 33 effectively and advantageously secure a fish 12 to the treble hooks 30 once the fish 12 has swallowed the apparatus 10.

Referring to FIGS. 1 and 2, the apparatus 10 further includes a diving plane 29 attached to the head portion 21A and subjacent to the third eyelet 28C. Such a diving plane is important and advantageous for directing the apparatus 10 to a desired depth within the water 11, thus further increasing the chances of a predatory fish 12 locating the lure 10. Of course, the apparatus 10 may be produced without the diving plane 29, or may be produced with diving planes 29 of various shapes and sizes so as to alter the diving characteristics of the apparatus 10 depending on the fishing application it is used for, as is obvious to a person of ordinary skill in the art.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A scented fishing lure for attracting and catching fish, said fishing lure comprising:

a body having a substantially bait fish shape provided with head and tail portions, said body consisting of a plurality of apertures medially and equidistantly spaced along a longitudinal axis of said body, said body consisting of a single opening medially formed in a top surface of said head portion wherein the opening is in fluid communication with both a single L-shaped channel extending therefrom and the apertures, said channel consisting of a vertical portion and a horizontal portion which intersect each other, said vertical portion continuing downwardly from said opening and being transverse to the longitudinal axis of said body and said horizontal portion extends parallel to the longitudinal axis of said body, wherein said channel vertical and horizontal portions being generally perpendicular to each other, said apertures being linearly aligned along a rectilinear path that is parallel with said longitudinal axis of said body, said apertures extending through a side of said body in a direction which is perpendicular to the longitudinal axis of said body, said apertures being equidistantly spaced from each other along said horizontal portion of said channel, said channel being suitably sized and shaped for housing a predetermined quantity of scented agents so that the scented agents can be contained within said channel and selectively discharged when said fishing lure travels through the water, said channel further having a closed distal end portion opposite from where the horizontal portion intersects the vertical portion for restricting the scented agents from prematurely exiting said body, said channel having a uniform diameter continuously extending along said vertical and horizontal portions respectively, said body includes a dorsal fin medially disposed along a top surface of said body, and wherein there are no other openings or apertures on or in said body except for said plurality of apertures, said opening, and said channel;

a plurality of eyelets directly conjoined to said body and extending outwardly therefrom, a first one of said eyelets being disposed subjacent to said head portion and extending orthogonally and downwardly therefrom, a second one of said eyelets being disposed subjacent to said tail portion and extending obliquely and downwardly therefrom, a third one of said eyelets being disposed adjacent to said head portion and extending orthogonally therefrom and parallel to the longitudinal axis of said body, said third eyelet having a diameter greater than said first and said second eyelets respectively so that a user can readily tether a fishing line thereto; and a plurality of treble hooks directly and pivotally conjoined to said first and second eyelets respectively, one of said treble hooks being conjoined to said first eyelet, another of said treble hooks being conjoined to said second eyelet;

wherein said treble hooks extend downwardly from said first and said second eyelets and are caused to pivot about said first and said second eyelets during operating conditions.

2. The fishing lure of claim 1, wherein said treble hooks include a shank portion and a plurality of barbs monolithically formed therewith, said barbs having an arcuate shape, said barbs being equidistantly spaced from said shank portion;

wherein said barbs have a tapered end portion extending upwardly towards said body and parallel to said shank portion.

3. The fishing lure of claim 1, wherein said channel extends along a partial length of the longitudinal axis for receiving a scented agent therein such that when said fishing lure is transported through an aqueous environment said scented agent is dispersed via the apertures for attracting fish.

4. A scented fishing lure for attracting and catching fish, said fishing lure comprising:
a body having a substantially bait fish shape provided with head and tail portions, said body consisting of a plurality of apertures medially and equidistantly spaced along a longitudinal axis of said body, said body consisting of a single opening medially formed in a top surface of said head portion wherein the opening is in fluid communication with both a single L-shaped channel extending therefrom and the apertures, said apertures being linearly aligned along a rectilinear path that is parallel with said longitudinal axis of said body, said apertures extending through a side of said body in a direction which is perpendicular to the longitudinal axis of said body, said channel consisting of a vertical portion and a horizontal portion which intersect each other, said vertical portion continuing downwardly from said opening and being transverse to the longitudinal axis of said body and said horizontal portion extends parallel to the longitudinal axis of said body, wherein said channel vertical and horizontal portions being generally perpendicular to each other, said apertures being equidistantly spaced from each other along said horizontal portion of said channel, said channel being suitably sized and shaped for housing a predetermined quantity of scented agents so that the scented agents can be contained within said channel and selectively discharged when said fishing lure travels through the water, said channel further having a closed distal end portion opposite from where the horizontal portion intersects the vertical portion for restricting the scented agents from prematurely exiting said body, said channel having a uniform diameter continuously extending along said vertical and horizontal portions respectively, said body includes a dorsal fin medially disposed along a top surface of said body, and wherein there are no other openings or apertures on or in said body except for said plurality of apertures, said opening, and said channel;
a plurality of eyelets directly conjoined to said body and extending outwardly therefrom, a first one of said eyelets being disposed subjacent to said head portion and extending orthogonally and downwardly therefrom, a second one of said eyelets being disposed subjacent to said tail portion and extending obliquely and downwardly therefrom, a third one of said eyelets being disposed adjacent to said head portion and extending orthogonally therefrom and parallel to the longitudinal axis of said body, said third eyelet having a diameter greater than said first and said second eyelets respectively so that a user can readily tether a fishing line thereto; and
a plurality of treble hooks directly and pivotally conjoined to said first and second eyelets respectively, one of said treble hooks being conjoined to said first eyelet, another of said treble hooks being conjoined to said second eyelet;
wherein said treble hooks extend downwardly from said first and said second eyelets and are caused to pivot about said first and said second eyelets during operating conditions;
wherein said one of said treble hooks terminates at a predetermined point lower than said another of said treble hooks.

5. The fishing lure of claim 4, wherein said treble hooks include a shank portion and a plurality of barbs monolithically formed therewith, said barbs having an arcuate shape, said barbs being equidistantly spaced from said shank portion;
wherein said barbs have a tapered end portion extending upwardly towards said body and parallel to said shank portion.

6. The fishing lure of claim 4, wherein said channel extends along a partial length of the longitudinal axis for receiving a scented agent therein such that when said fishing lure is transported through an aqueous environment said scented agent is dispersed via the apertures for attracting fish.

7. A scented fishing lure for attracting and catching fish, said fishing lure comprising:
a body having a substantially bait fish shape provided with head and tail portions, said body consisting of a plurality of apertures medially and equidistantly spaced along a longitudinal axis of said body, said apertures being linearly aligned along a rectilinear path that is parallel with said longitudinal axis of said body, said apertures extending through a side of said body in a direction which is perpendicular to the longitudinal axis of said body, said body consisting of a single opening medially formed in a top surface of said head portion wherein the opening is in fluid communication with both a single L-shaped channel extending therefrom and the apertures, said channel consisting of a vertical portion and a horizontal portion which intersect each other, said vertical portion continuing downwardly from said opening and being transverse to the longitudinal axis of said body and said horizontal portion extends parallel to the longitudinal axis of said body, wherein said channel vertical and horizontal portions being generally perpendicular to each other, said apertures being equidistantly spaced from each other along said horizontal portion of said channel, said channel being suitably sized and shaped for housing a predetermined quantity of scented agents so that the scented agents can be contained within the channel and selectively discharged when said fishing lure travels through the water, said channel further having a closed distal end portion opposite from where the horizontal portion intersects the vertical portion for restricting the scented agents from prematurely exiting said body, said channel having a uniform diameter continuously extending along said vertical and horizontal portions respectively, said body includes a dorsal fin medially disposed along a top surface of said body, and wherein there are no other openings or apertures on or in said body except for said plurality of apertures, said opening, and said channel;
a plurality of eyelets directly conjoined to said body and extending outwardly therefrom, a first one of said eyelets being disposed subjacent to said head portion and extending orthogonally and downwardly therefrom, a second one of said eyelets being disposed subjacent to said tail portion and extending obliquely and downwardly therefrom, a third one of said eyelets being disposed adjacent to said head portion and extending orthogonally therefrom and parallel to the longitudinal axis of said body, said third eyelet having a diameter greater than said first and said second eyelets respectively so that a user can readily tether a fishing line thereto; and a plurality of coextensive treble hooks directly and pivotally conjoined to said first and second eyelets respectively, one of said treble hooks being conjoined to said first eyelet, another of said treble hooks being conjoined to said second eyelet;

wherein said treble hooks extend downwardly from said first and said second eyelets and are caused to pivot about said first and said second eyelets during operating conditions;

wherein said one of said treble hooks terminates at a predetermined point lower than said another of said treble hooks.

8. The fishing lure of claim 7, wherein said treble hooks include a shank portion and a plurality of barbs monolithically formed therewith, said barbs having an arcuate shape, said barbs being equidistantly spaced from said shank portion;

wherein said barbs have a tapered end portion extending upwardly towards said body and parallel to said shank portion.

9. The fishing lure of claim 7, wherein said channel extends along a partial length of the longitudinal axis for receiving a scented agent therein such that when said fishing lure is transported through an aqueous environment said scented agent is dispersed via the apertures for attracting fish.

* * * * *